United States Patent [19]

Asada

[11] Patent Number: 5,257,189
[45] Date of Patent: Oct. 26, 1993

[54] SPEED STAGE SHIFTING OF AUTOMATIC TRANSMISSION OF AUTOMOBILE IN RELATION TO YAW RATE IN STEERING

[75] Inventor: Toshiyuki Asada, Toyota, Japan

[73] Assignee: Toyota Jidosha Kabushiki Kaisha, Toyota, Japan

[21] Appl. No.: 736,244

[22] Filed: Jul. 26, 1991

[30] Foreign Application Priority Data

Aug. 7, 1990 [JP] Japan .................. 2-208665
Aug. 9, 1990 [JP] Japan .................. 2-210649

[51] Int. Cl.⁵ .................. G06F 15/50; G06F 7/70
[52] U.S. Cl. .................. 364/424.1; 364/424.05; 364/426.02; 180/197
[58] Field of Search .......... 364/424, 424.05, 424.06, 364/424.1, 426.02; 74/866; 180/14, 197

[56] References Cited

U.S. PATENT DOCUMENTS

| | | |
|---|---|---|
| 4,523,281 | 6/1985 | Noda et al. .................. 364/424.1 |
| 4,584,906 | 4/1986 | Nagaoka et al. .................. 74/866 |
| 4,711,317 | 12/1987 | Sakakiyama .................. 180/197 |
| 4,720,790 | 1/1988 | Miki et al. .................. 364/424 |
| 4,733,580 | 3/1988 | Kubo et al. .................. 74/866 |
| 5,020,619 | 6/1991 | Kanazawa et al. .................. 180/14 |
| 5,032,997 | 7/1991 | Kawagoe .................. 364/424.05 |
| 5,047,939 | 9/1991 | Ito et al. .................. 364/424.05 |
| 5,051,908 | 9/1991 | Shiraishi .................. 364/426.02 |
| 5,156,229 | 10/1992 | Yasui et al. .................. 364/424.05 |

FOREIGN PATENT DOCUMENTS

| | | |
|---|---|---|
| 60-57036 | 4/1985 | Japan . |
| 61-84453 | 4/1986 | Japan . |
| 61-229616 | 10/1986 | Japan . |
| 62-99213 | 5/1987 | Japan . |
| 62-198522 | 9/1987 | Japan . |
| 63-76944 | 4/1988 | Japan . |
| 1-145457 | 6/1989 | Japan . |

*Primary Examiner*—Thomas G. Black
*Assistant Examiner*—J.H. Louis-Jacques
*Attorney, Agent, or Firm*—Oblon, Spivak, McClelland, Maier & Neustadt

[57] ABSTRACT

Whether the load on the automobile is normal or heavy or whether the automobile is in a normal, oversteering or understeering condition is detected by a rising-up performance of the yaw rate in the initial transient state of steering from a comparison of an actual yaw rate detected by a sensor and a standard yaw rate calculated from vehicle speed and steering angle, and the speed stage shifting of the automatic transmission is modified according to the result of the comparison so as to compensate for a change of load or a deviation of steering performance from a normal condition.

7 Claims, 5 Drawing Sheets

FIG. 5
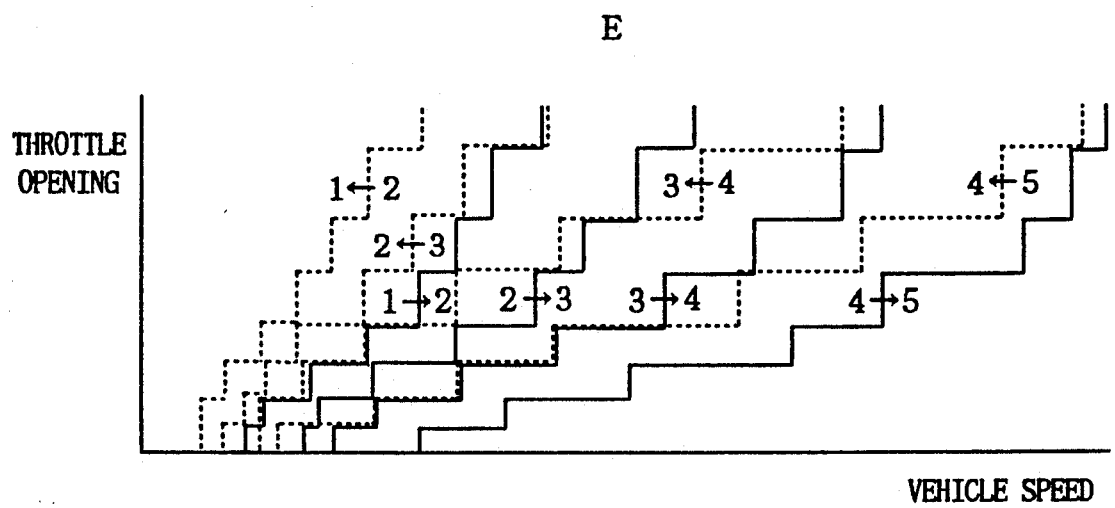
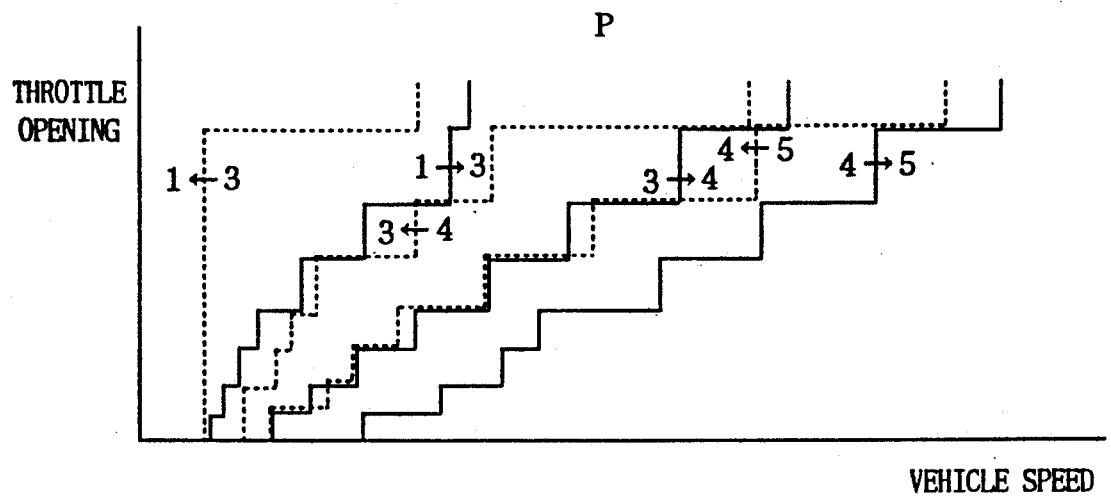

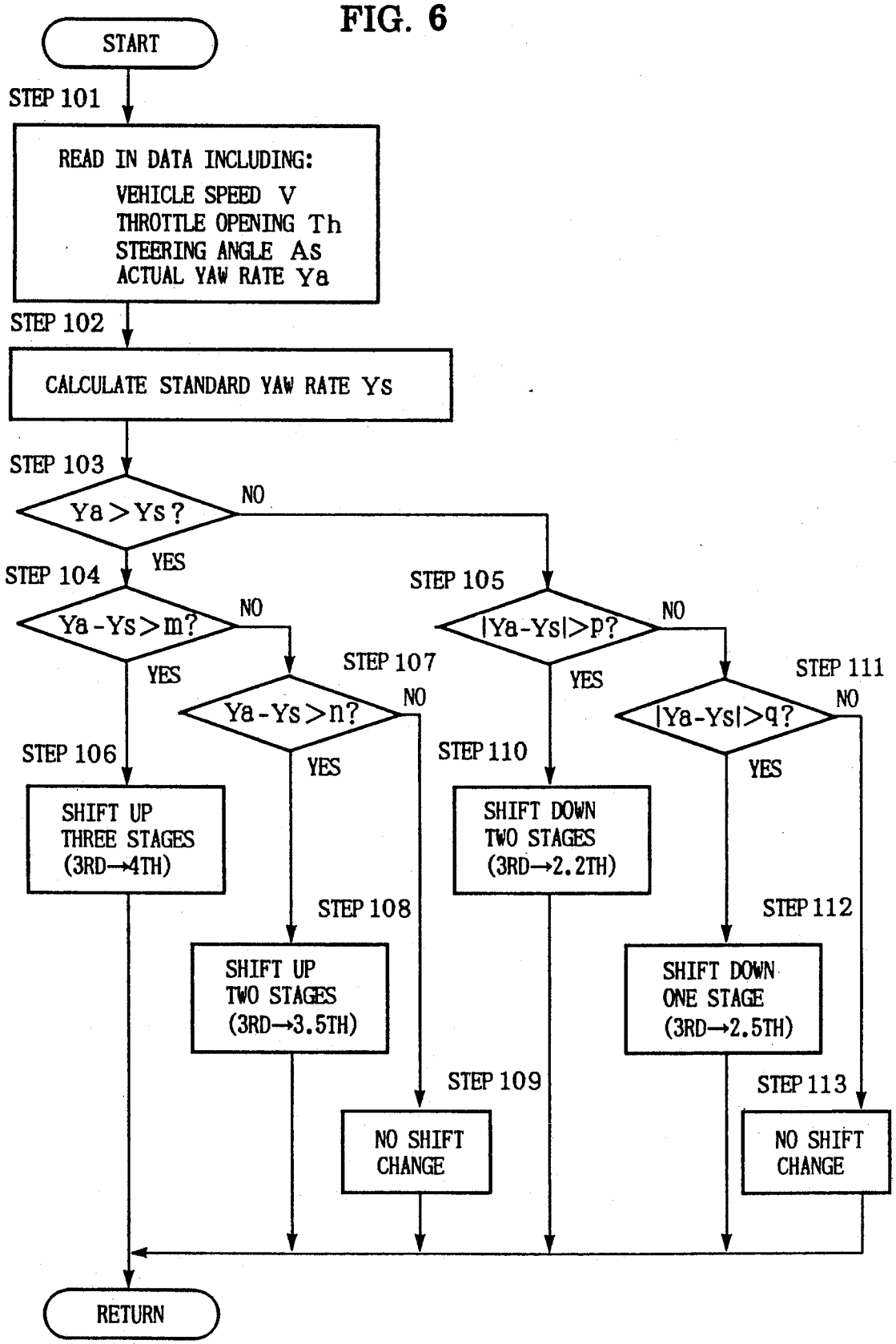

SPEED STAGE SHIFTING OF AUTOMATIC TRANSMISSION OF AUTOMOBILE IN RELATION TO YAW RATE IN STEERING

BACKGROUND OF THE INVENTION

1. Field of the Invention

The present invention relates to a control of a running condition of an automobile, and more particularly, to speed stage shifting of an automatic transmission of an automobile.

2. Description of the Prior Art

It is already known to shift the speed stages of the automatic transmission according to a selection between a power shift pattern prepared with a preference on the power performance of the automobile to the fuel consumption thereof and an economy shift pattern prepared with a preference on the fuel consumption of the automobile to the power performance thereof as described in, for example, U.S. Pat. No. 4,733,580 assigned to the same assignee as the present application. The selection between the power shift pattern and the economy shift pattern has been conventionally generally left to the manual switching operation by the driver.

In Japanese Patent Application 62-304779 (Laid-open Publication 1-145457) assigned to the same assignee as the present application, it has been proposed to control an automatic transmission of an automobile including a main speed change gear mechanism and an auxiliary speed change gear mechanism connected in series to provide a plurality of speed stages, particularly in accordance with the load on the automobile so that, in addition to a standard speed stage shifting of the automatic transmission based upon vehicle speed and throttle opening, the auxiliary speed change gear mechanism is shifted down when the load on the vehicle is greater than a standard load expected to be imposed by a driver or a driver and a companion, in order to improve the power performance of the automobile in a high load condition imposed by a join of more passengers and/or baggages, while ensuring a high economy performance in the normal use of the automobile under the normal load. Although this idea will be effective in automatically harmonizing the power performance and the economy performance of the automobile, there is a difficulty in detecting the load at high reliability with less costs for load sensing equipments, because, although the load on the automobile would be detected at the suspension of the vehicle body by a vehicle wheel, since the load on the vehicle generally shows a high variety in the distribution thereof on the four wheels, load sensing means would be required at all four vehicle wheel suspensions.

On the other hand, in Japanese Patent Laid-open Publication 62-198522, it has been proposed to control a steering performance of an automobile so that the yaw rate in the steering of the automobile follows a standard performance predetermined to be desirable therefore by controlling the distribution of the driving torque between the front vehicle wheels and the rear vehicle wheels in a four wheel drive vehicle and between a left rear vehicle wheel and a right rear vehicle wheel in a rear wheel drive vehicle. This prior art is based upon the recognition that a steering performance such as the so-called oversteering or understeering of the automobile can be changed according to a change of distribution of the driving torque between the front and rear vehicle wheels or between the rear left and rear right vehicle wheels.

SUMMARY OF THE INVENTION

In relation to solving the difficulty in detecting the load on the automobile at high reliability with less costs for load sensing equipments, it has been conceived by the inventor of the present application to use the yaw rate in the steering of the automobile as a parameter to indicate the loading condition of the automobile.

Further, in this connection, based upon the concept of controlling the speed stage shifting in relation to the yaw rate in the steering of the automobile, it has also been conceived to control the steering performance of the automobile according to a control of speed stage shifting of the automatic transmission.

Therefore, it is a general object of the present invention to provide a method of controlling a running condition of an automobile by interrelating the speed stage shifting of an automatic transmission of the automobile with the yaw rate in the steering of the automobile.

It is a first more particular object of the present invention to control the speed stage shifting of an automatic transmission of an automobile to meet with the loading condition of the automobile based upon the yaw rate in the steering thereof.

It is a second more particular object of the present invention to control the speed stage shifting of an automatic transmission of an automobile to obtain a desired steering performance of the automobile.

According to the present invention, the above-mentioned general object is accomplished by a method of controlling a running condition of an automobile equipped with an automatic transmission for selectively providing a plurality of speed stages, means for detecting operational conditions of the automobile including vehicle speed, steering angle and actual yaw rate, and an electronic control means for processing signals received from said operational condition detecting means and controlling said automatic transmission so as to shift the speed stages based upon said signals, comprising the steps of calculating a standard yaw rate according to the vehicle speed and the steering angle, comparing the calculated standard yaw rate and the actual yaw rate detected by said operational condition detecting means, and modifying the speed stage shift control by said electronic control means according to the difference between the actual yaw rate and the standard yaw rate.

According to an aspect of the present invention, the automatic transmission to be controlled according to the method of the present invention is so constructed that a normal load shift pattern and a heavy load shift pattern are provided by different combinations of certain speed stages selected from said plurality of speed stages, said heavy load shift pattern providing generally greater reduction gear ratios for respective speed stages of a series of gradually decreasing gear ratios in the combination of speed stages thereof than reduction gear ratios for respective speed stages of a series of gradually decreasing gear ratios in the combination of speed stages of said normal load shift pattern, and said normal load shift pattern is used for the speed stage shifting when the actual yaw rate is not smaller than the standard yaw rate over a predetermined limit amount, whereas said heavy load shift pattern is used for the speed stage shifting when the actual yaw rate is smaller than the standard yaw rate over said predetermined limit amount.

Alternatively, the automatic transmission to be controlled according to the method of the present invention may be so constructed that a normal load shift pattern and a heavy load shift pattern are provided with respect to a speed stage shifting diagram including a plurality of shift lines each defined with respect to a relation between vehicle speed and throttle opening for shifting up or down the speed stages, said heavy load shift pattern providing generally lower speed stages than said normal load shift pattern for certain determinate relations between vehicle speed and throttle opening, and said normal load shift pattern is used for the speed stage shifting when the actual yaw rate is not smaller than the standard yaw rate over a predetermined amount of difference, whereas said heavy load shift pattern is used for the speed stage shifting when the actual yaw rate is smaller than the standard yaw rate over said predetermined amount of difference.

According to another aspect of the present invention, when the automobile is of a rear drive type, the speed stage is shifted up when the actual yaw rate is greater than the standard yaw rate over a first predetermined amount of difference.

In this case, the speed stage may be shifted up more than one speed stage when the actual yaw rate is greater than the standard yaw rate over a second predetermined amount of difference greater than said first predetermined amount of difference.

Further, similarly but conversely, the speed stage is shifted down when the actual yaw rate is smaller than the standard yaw rate over a first predetermined amount of difference.

In this case, the speed stage may be shifted down more than one speed stage when the actual yaw rate is smaller than the standard yaw rate over a second predetermined amount of difference greater than said first predetermined amount of difference.

BRIEF DESCRIPTION OF THE DRAWINGS

In the accompanying drawings,

FIG. 5 shows a combination of an economy shift pattern (E) and a power shift pattern (P) employable for carrying out the operation control of automobile according to the present invention; and FIG. 6 is a flow chart showing a second embodiment of the operation control of automobile according to the present invention.

DESCRIPTION OF THE PREFERRED EMBODIMENTS

In the following the present invention will be described in more detail with respect to some embodiments thereof with reference to the accompanying drawings.

Figure 1:
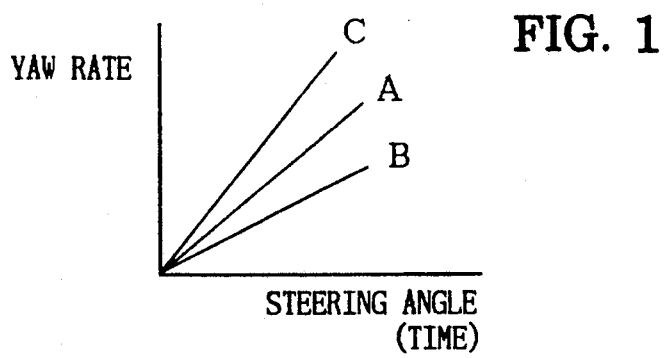
FIG. 1 is a graph showing a dynamic performance of the yaw rate of the vehicle body in the steering of the automobile according to changes of the load and the wheel driving torque.

Referring to FIG. 1, here is shown in a general manner a dynamic performance of the yaw rate of the vehicle body only in the initial stage of steering of the automobile according to changes of the load and the wheel driving torque. When the steering wheel of an automobile is turned for turning the automobile, the vehicle body starts to turn, i.e. yaw. As is well known in the art, when a pair of front steering vehicle wheels are steered by a turn of the steering wheel of an angle As at a vehicle speed V in a four wheel automobile having a wheel base distance L, the yaw rate Y is defined by $Y = V/R$ wherein R is a radius of turn and is theoretically obtained by $R = q \cdot L / \tan(As/r)$ wherein r is the gear ratio of the steering system and q is a constant incorporating a particular steering characteristic of the automobile.

In the initial transient stage where the steering angle increases with the lapse of time, the rising-up of the yaw rate is delayed as compared with a certain standard performance shown by line A as shown by line B when the load on the vehicle body increases. Similarly, the rising-up of the yaw rate advances as shown by line C relative to the line A when the driving torque applied to the rear driving vehicle wheels is greater than that corresponding to the line A. Therefore, conversely, the rising-up of the yaw rate is delayed like the line B when the driving torque applied to the rear driving vehicle wheels is lower than that corresponding to the line A. The present invention uses such a delay or advance in the rising-up of the yaw rate in the initial transient stage of steering as a parameter for controlling the speed stage shifting of the automatic transmission.

Figure 2:
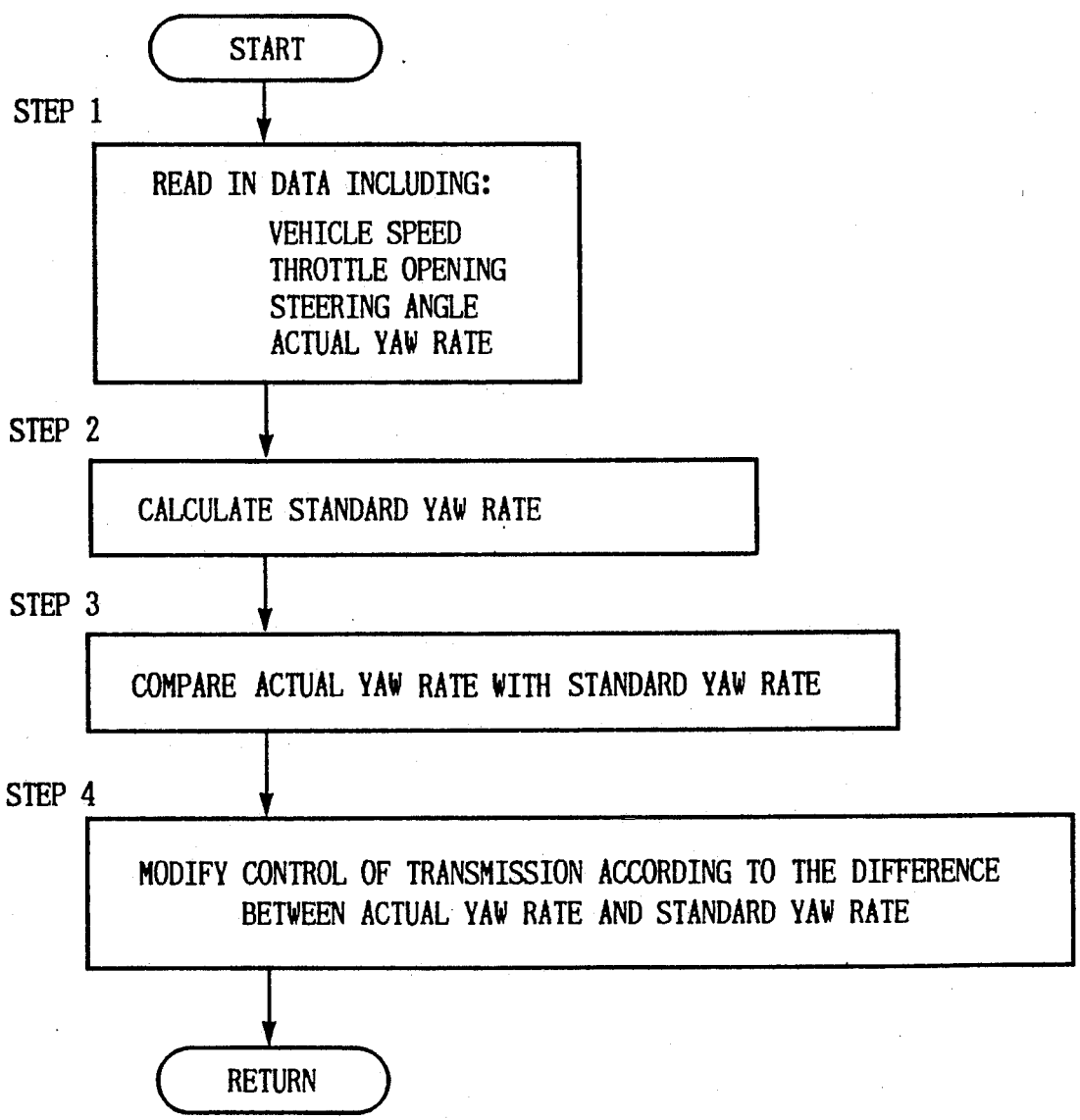
FIG. 2 is a flow chart showing the basic concept of the operation control of automobile according to the present invention.

In FIG. 2, the basic concept of the operation control of automobile according to the present invention is shown in the form of a flow chart setting out the steps of control operation. After the start of the control operation, in step 1 the data necessary for carrying out the control operation are read in from various means for detecting operational conditions of the automobile. Although such operational condition detecting means are not shown in the figure, they are generally well known in the art. The data may include vehicle speed, throttle opening, steering angle, and actual yaw rate. Since the yaw rate is obtained by an integrating calculation of rate of change of actual yaw rate which indicates a kind of acceleration in the yawing movement, the reading in of the actual yaw rate is to be understood to include the reading in of the rate of change of yaw rate as supported by an appropriate calculation process.

In step 2, the value of a standard yaw rate is calculated based upon the instant vehicle speed and the instant steering angle according to the equations described above. This standard yaw rate correspond to the line A in FIG. 1.

In step 3, the actual yaw rate obtained from the operational condition detecting means is compared with the standard yaw rate obtained in step 2. By this comparison it is known if the automobile designed for a standard operation corresponding to a standard performance like the line A in FIG. 1 is operating under a heavy load or is turning in an oversteering or an understeering tendency.

In step 4, the control of the transmission is modified according to the difference between the actual yaw rate and the standard yaw rate so as to meet with the heavy load or to correct the oversteering or the understeering, as described in more detail hereinunder.

The operation control of the automobile according to the steps 1-4 may be repeated at an appropriate cycle time such as several microseconds so to be able to follow swift changes of operational conditions of the automobile. However, since the load on the automobile does not generally change while the automobile is running, when the modification of the control of transmission according to the present invention is to meet with the load, the control according to the steps 1-4 may be conducted only for a short period to detect the loading condition and determine the shift pattern at every start of running of the automobile. Further, it will be obvious to those skilled in the art that the control operation according to the steps 1-4 should be conducted only when the automobile is running under an appropriate environmental condition with respect to weather, geography or the like, or in other words, the control operation is to be suspended when the environmental condition is not appropriate for conducting the control operation.

Figure 3:
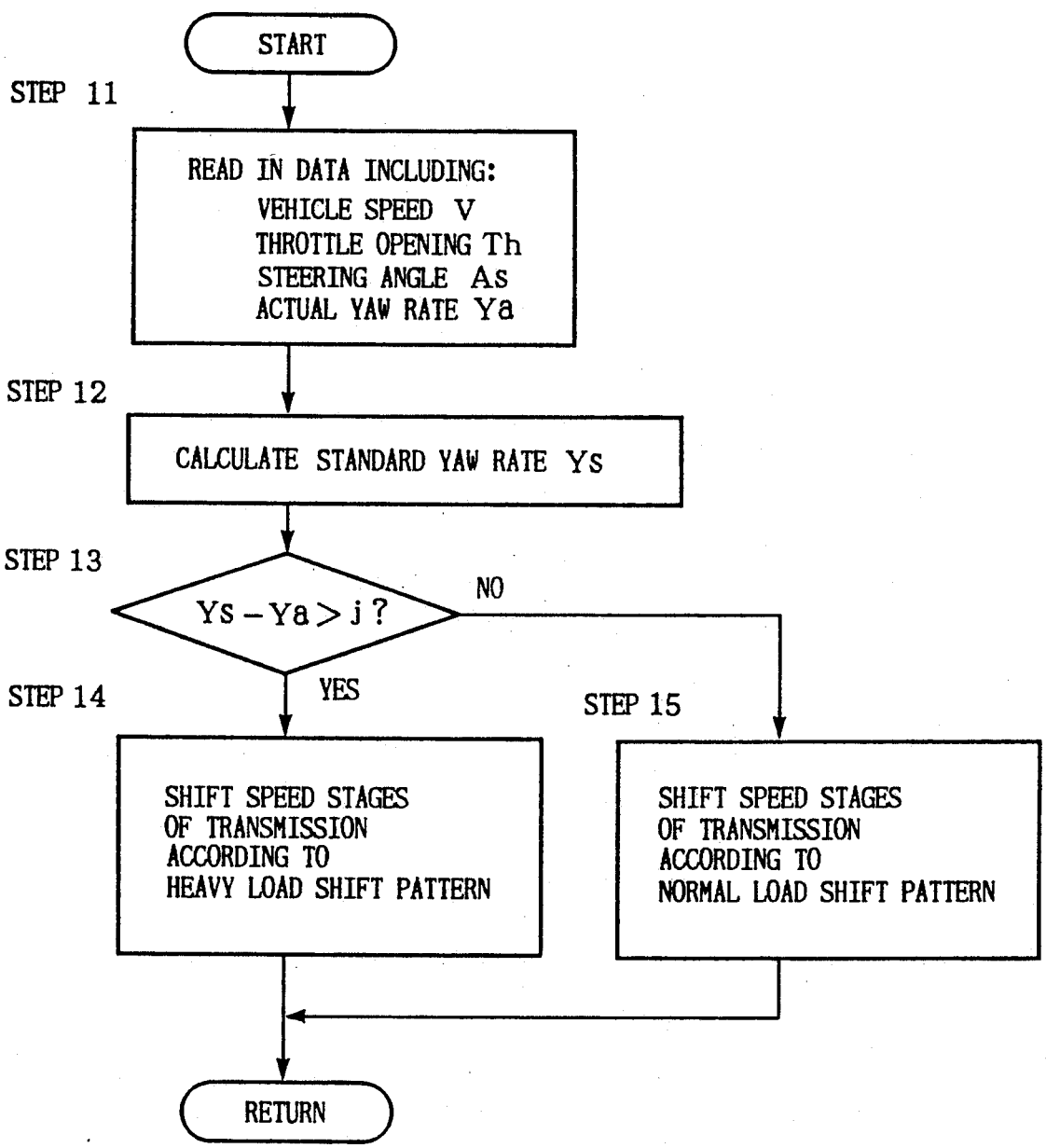
FIG. 3 is a flow chart showing a first embodiment of the operation control of automobile according to the present invention.

In FIG. 3, a first embodiment of the operation control of automobile according to the present invention is shown in a flow chart corresponding to that in FIG. 2. After the start, in step 11 the data with regard to the operational conditions of the automobile including vehicle speed V, throttle opening Th, steering angle As and actual yaw rate Ya are read in.

In step 12, a standard yaw rate Ys is calculated based upon the vehicle speed V and the steering angle As as described above.

In step 13, it is checked if the actual yaw rate Ya is not smaller than the standard yaw rate Ys over a predetermined amount of difference j. If the answer is "yes", the control process proceeds to step 14, whereas if the answer is "no", the control process proceeds to step 15.

In step 14, the automatic transmission is controlled to shift speed stages according to a power load shift pattern as described in more detail hereinunder.

In step 15, the automatic transmission is controlled to shift speed stages according to a normal load shift pattern as also described in more detail hereinunder.

Figure 4:
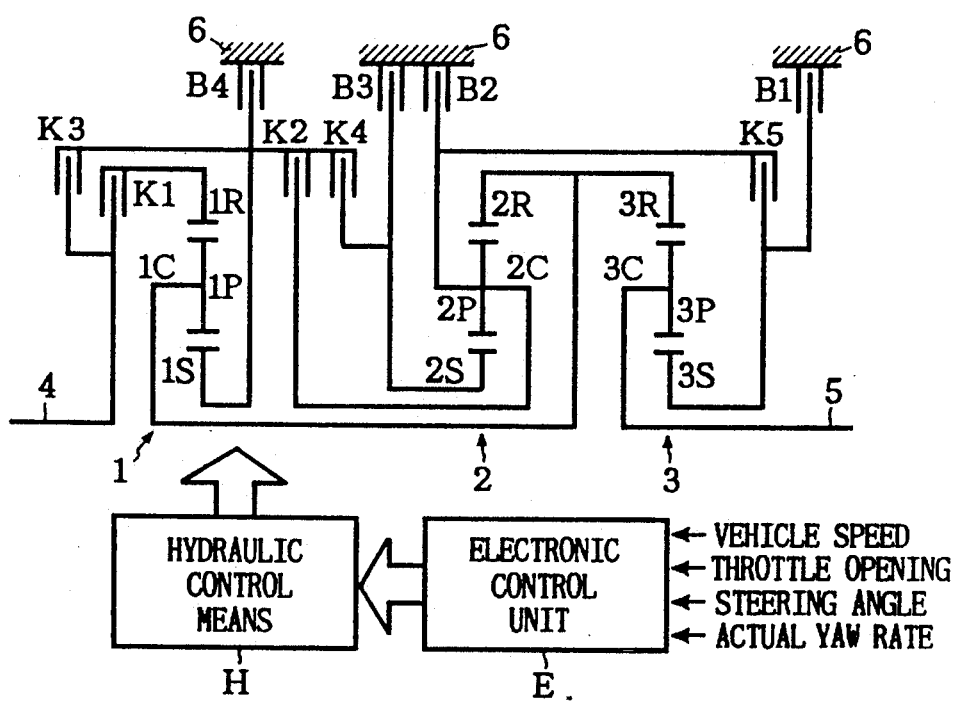
FIG. 4 is a diagrammatical illustration of an automatic transmission to which the operation control of automobile according to the present invention is applicable.

FIG. 4 shows in a diagrammatical illustration an automatic transmission to which the operation control of automobile according to the present invention is applicable. This automatic transmission comprises a speed change gear mechanism including three planetary gear mechanisms generally designated by reference numerals 1, 2 and 3, respectively. The planetary gear mechanism 1 comprises a sun gear 1S, a ring gear 1R, a plurality of planetary pinions 1P only one of which is shown in the figure, and a carrier 1C supporting the planetary pinions 1P to be rotatable as a whole about an axis of rotation common with those of the sun gear 1S and the ring gear 1R. The planetary gear mechanisms 2 and 3 have constructions similar to that of the planetary gear mechanism 1. So the planetary gear mechanisms 2 and 3 comprise sun gears 2S and 3S, ring gears 2R and 3R, planetary pinions 2P and 3P, and carriers 2C and 3C, respectively. An input shaft is designated by reference numeral 4, while an output shaft is designated by reference numeral 5. Reference numerals 6 designate several portions of a housing of the automatic transmission.

The speed change gear mechanism further includes clutches K1, K2, K3, K4 and K5, each having a first friction member diagrammatically shown as an outer race member having a pair of spaced friction engaging elements only for the convenience of illustration and a second friction member diagrammatically illustrated as an inner race member adapted to be selectively clamped between said pair of friction elements of said outer race member also only for the convenience of illustration. The speed change gear mechanism also includes brakes B1, B2, B3 and B4, each having a first friction member diagrammatically shown as an outer race member having a pair of spaced friction engaging elements also only for the convenience of illustration and a second friction member diagrammatically illustrated as an inner race member adapted to be selectively clamped between said pair of friction elements of said outer race member also only for the convenience of illustration.

As illustrated in FIG. 4, the input shaft 4 is connected, in parallel, with the inner race members of the clutches K1 and K3. The outer race member of the clutch K1 is connected with the ring gear 1R. The outer race member of the clutch K3 is connected, in parallel, with the sun gear 1S, the outer race members of the clutches K2 and K4 and the inner race member of the brake B4. The outer race member of the brake B4 is connected with the housing 6. The carrier 1C is connected, in parallel, with the ring gears 2R and 3R. The inner race member of the clutch K2 is connected with the carrier 2C. The inner race member of the clutch K4 is connected, in parallel, with the sun gear 2S and the inner race member of the brake B3. The outer race member of the brake B3 is connected with the housing 6. The carrier 2C is also connected, in parallel, with the inner race member of the brake B2 and the outer race member of the clutch K5. The outer race member of the brake B2 is connected with the housing 6. The inner race member of the clutch K5 is connected, in parallel, with the sun gear 3S and the inner race member of the brake B1. The outer race member of the brake B1 is connected with the housing 6. The carrier 3C is connected with the output shaft 5.

The clutches K1-K5 and the brakes B1-B4 are all of the type operated by hydraulic actuators. Supply and exhaust of certain hydraulic pressures to and from these hydraulic actuators are controlled by a hydraulic control means H diagrammatically shown by a block. The hydraulic control means H is controlled by an electronic control unit E also diagrammatically shown by a block. The electronic control unit is supplied with input signals such as vehicle speed, throttle opening and cooling water temperature as a principal part of information based upon which the electronic control unit E computes a desired operating condition of the automatic transmission and controls the hydraulic control means C so as to shift the speed stages of the automatic transmission.

The speed change gear mechanism shown in FIG. 4 can provide various speed stages according to selective engagement of the clutches K1-K5 and brakes B1-B4 as shown in TABLE 1.

In TABLE 1, the speed stages available are shown in column S, wherein "1" indicates the so-called 1st or the lowest speed stage, "2" indicates the so-called 2nd speed stage, "3" indicates the so-called 3rd speed stage, "4" indicates the so-called 4th speed stage, "5" indicates the so-called 5th speed stage, and "R" indicates the reverse stage. In addition to these popular speed stages, the speed change gear mechanism shown in FIG. 4 can provide intermediate speed stages such as "2.2" and "2.5" of gradually increasing reduction gear ratios between the 2nd speed stage and the 3rd speed stage, intermediate speed stages such as "3.2" and "3.5" of gradually increasing reduction gear ratios between the 3rd speed stage and the 4th speed stage, and an intermediate speed stage such as "4.5" between the 4th speed stage and the 5th speed stage.

Further, as shown in TABLE 1, this speed change gear mechanism can provides three different kinds of 1st speed stage such as "a", "b" and "c" by different combinations of engagement (and therefore disengagement according to a reversed view) of the clutches and the brakes, each such selective combination of engagement of the clutches and the brakes being referred to hereinunder as a pattern of combination of engagement and disengagement of the friction engaging means, or sometimes only as a pattern. Similarly, this speed change gear mechanism can provides four kinds of 2nd speed stages such as "a" to "d", four kinds of 3rd speed stage such as "a" to "d", four kinds of 4th speed such as "a" to "d", and three kinds of reverse speed stage such as "a" to "c" according to different patterns of combination engagement of the friction engaging means.

The numerical values in columns K1-K5 and B1-B4 indicate that the corresponding clutches and brakes are engaged to provide the corresponding speed stage, respectively, and also show the magnitudes of torque to be borne by the corresponding clutches and brakes, respectively, provided that an input torque of the magnitude of 1.00 is imposed on the input shaft 4. Therefore, for example, when the clutches K1 and K4 and the brakes B1 and B2 are engaged, the kind "a" of the 1st speed stage (referred to as "1-a" stage, and so on hereinunder) is established with the clutch K1 bearing a torque of the magnitude of 1.00, the clutch K4 bearing a torque of the magnitude of 0.45, the brake B1 bearing a torque of the magnitude of 0.59 and the brake B2 bearing a torque of the magnitude of 1.56 when an input torque of the magnitude of 1.00 is imposed on the input shaft 4. These combinations of shares of torque load are based upon the condition that the gear ratios between the sun gear and the ring gear in the planetary gear mechanisms 1, 2 and 3 are 0.450, 0.569 and 0.405, respectively.

In this connection, it is to be noted that the combination of engagement of the clutches and/or brakes for each speed stage or each kind of a speed stage shows each necessary minimum combination of the clutches and brakes to be engaged for providing the corresponding stage. This does not mean that no other clutch or brake be engaged. Some of the clutches and the brakes may be engaged in addition to those forming the respective patterns shown in the table. For example, in order to provide 1-a stage, it is essential that clutches K1 and K4 and the brakes B1 and B2 are engaged. 1-b stage is obtained by modifying 1-a stage so that the brake B1 which holds the sun gear 3S against rotation is disengaged, and as a substitute therefor, the clutch K5 is engaged to hold the sun gear 3S against rotation from the brake B2. Therefore, in 1-b stage, the brake B1 may also be engaged. Similarly, 1-c stage is obtained by modifying 1-a stage so that the brake B2 which holds the carrier 2C against rotation is disengaged, and as a substitute therefor, the clutch K5 is engaged to hold the carrier 2C from the brake B1, or is also obtained as modified from 1-b stage so that the responsibility of holding the combination of the sun gear 3S and the carrier 2C by the clutch K5 against rotation is transferred from the brake B2 to the brake B1. Therefore, in 1-b and 1-c stages, both of the brakes B1 and B2 may be engaged. However, the sharing of the torque among respective clutches and brakes changes from those shown in the table.

Further, in TABLE 1, the reduction gear ratios available in the respective speed stages are shown in column X.

When the operation control is applied to the automatic transmission shown in FIG. 4, the normal load shift pattern may be a combination of speed stages "2", "2.2", "3.2", "4" and "5" so that a series of gradually decreasing reduction gear ratios 2.037, 1.634, 1.299, 1.00 and 0.712 are available, and the heavy load shift pattern may be a combination of speed stages "1", "2", "3" and "4" so that a series of gradually decreasing reduction gear ratios 3.149, 2.037, 1.405 and 1.00 are available.

The difference between the normal load shift pattern and the heavy load shift pattern may be a difference in the relation between vehicle speed and throttle opening for shifting up or down the speed stages so that the heavy load shift pattern provides generally lower speed stages than the normal load shift pattern for certain determinate relations between vehicle speed and throttle opening. Such a combination of the normal load shift pattern and the heavy load shift pattern will be available by a combination of the upper diagram (E) in FIG. 5 which is an example of a shift pattern conventionally known as an economy shift pattern and the lower diagram (P) in FIG. 5 which is an example of a shift pattern conventionally known as a power shift pattern. In fact, the shift patterns E and P in FIG. 5 are those shown in the above-mentioned U.S. Pat. No. 4,733,580. In these diagrams, the notations with respect to the shift lines indicate that speed stages are shifted from such speed stages to such speed stages in the direction of arrows.

FIG. 6 shows another embodiment of the operation control of automatic transmission according to the present invention which is also applicable to the automatic transmission shown in FIG. 4 in order to correct an oversteering or an understeering condition of the automobile by the speed stage shift control in relation to the yaw rate. Also in this embodiment, after the start of control, in step 101 corresponding to step 1 or step 11 in the preceding flow chart, the data with regard to the operational conditions of the automobile including vehicle speed V, throttle opening Th, steering angle As and actual yaw rate Ya are read in from the operational condition detecting means.

In step 102, a standard yaw rate Ys is calculated based upon the vehicle speed V and the steering angle As as described above.

In step 103, it is checked if the actual yaw rate Ya is greater than the standard yaw rate Ys, and if the answer is "yes", the control process proceeds to step 104, whereas if the answer is "no", the control process proceeds to step 105.

In step 104, it is checked if the actual yaw rate Ya is greater than the standard yaw rate Ys over a predetermined amount of difference m, and if the answer is "yes", the control process proceeds to step 106, whereas if the answer is "no", the control process proceeds to step 107.

In step 106, the speed stage is shifted up three stages so as to decrease the driving torque applied to the rear driving vehicle wheels at a high rate, because the automobile is in a highly oversteering tendency at this time. Therefore, if, for example, the automobile is running at the 3rd speed stage, the speed stage is directly shifted up to the 4th speed stage by skipping over the 3.2 and 3.5 stages.

In step 107, it is checked if the actual yaw rate Ya is greater than the standard yaw rate Ys over a predetermined amount of difference n smaller than m, and if the answer is "yes", the control process proceeds to step 108, whereas if the answer is "no", the control process proceeds to step 109.

In step 108, the speed stage is shifted up two stages so as to decrease the driving torque applied to the rear driving vehicle wheels at a moderate rate, because the automobile is in a slightly oversteering tendency at this time. Therefore, if, for example, the automobile is running at the 3rd speed stage, the speed stage is shifted up to the 3.5 stage by skipping the 3.2 stage.

In step 109, no shift change for the purpose of correcting the steering performance by the speed stage shifting control according to the present invention is performed.

In step 105, it is checked if the absolute value of the difference between the actual yaw rate Ya and the standard yaw rate Ys is greater than a predetermined amount of difference p, and if the answer is "yes", the control process proceeds to step 110, whereas if the answer is "no", the control process proceeds to step 111.

In step 110, the speed stage is shifted down two stages so as to increase the driving torque applied to the rear driving vehicle wheels at a relatively high rate, because the automobile is in a relatively highly understeering tendency at this time. Therefore, if, for example, the automobile is running at the 3rd speed stage, the speed stage is directly shifted down to the 2.2 speed stage by skipping over the 2.5 stage.

In step 111, it is checked if the absolute value of the difference between the actual yaw rate Ya and the standard yaw rate Ys is greater than a predetermined amount of difference q smaller than p, and if the answer is "yes", the control process proceeds to step 112, whereas if the answer is "no", the control process proceeds to step 113.

In step 112, the speed stage is shifted down one stage so as to increase the driving torque applied to the rear driving vehicle wheels at a relatively moderate rate, because the automobile is in a relatively slightly understeering tendency at this time. Therefore, if, for example, the automobile is running at the 3rd speed stage, the speed stage is shifted down to the 2.5 speed stage.

In step 113, no shift change for the purpose of correcting the steering performance by the speed stage shifting control according to the present invention is performed.

Although the invention has been described in detail with respect to some preferred embodiments thereof, it will be appreciated that the inventive concept of the present invention can be carried out by various embodiments without departing from the scope of the present invention.

TABLE 1

| S | K1 | K2 | K3 | K4 | K5 | B1 | B2 | B3 | B4 | X |
|---|----|----|----|----|----|----|----|----|----|---|
| 1 | | | | | | | | | | |
| a | 1.00 | | | 0.45 | | 0.59 | 1.56 | | | 3.149 |
| b | 1.00 | | | 0.45 | 0.59 | | 2.15 | | | |
| c | 1.00 | | | 0.45 | 1.56 | 2.15 | | | | |
| 2 | | | | | | | | | | |
| a | 1.00 | 0.45 | | | | 0.59 | 0.45 | | | 2.037 |
| b | 1.00 | 0.45 | | | 0.59 | | 1.04 | | | |
| c | 1.00 | 0.45 | | | 0.45 | 1.04 | | | | |
| d | 1.00 | | | 0.45 | | 0.59 | | 0.45 | | |
| 2.2 | 1.00 | 0.45 | | | | | 0.47 | 0.16 | | 1.634 |
| 2.5 | 1.00 | | | 0.45 | 0.47 | | | 0.62 | | 1.619 |
| 3 | | | | | | | | | | |
| a | 0.69 | 0.31 | | | | 0.41 | | | | 1.405 |
| b | 0.69 | 0.31 | | | 0.41 | | 0.41 | | | |
| c | 1.00 | 0.71 | | 0.26 | | 0.41 | | | | |
| d | | 1.57 | 1.00 | 0.57 | | 0.41 | | | | |
| 3.2 | 1.00 | 0.45 | | | 0.38 | | | 0.30 | | 1.299 |
| 3.5 | 0.69 | | 0.31 | | 0.32 | | | 0.12 | | 1.117 |
| 4 | | | | | | | | | | |
| a | 0.49 | 0.29 | 0.51 | | 0.29 | | | | | 1.000 |
| b | 1.00 | 0.86 | | 0.42 | 0.29 | | | | | |
| c | 0.62 | | 0.38 | 0.10 | 0.29 | | | | | |
| d | | 1.40 | 1.00 | 0.40 | 0.29 | | | | | |
| 4.5 | 1.00 | 1.00 | | | | 0.26 | | 0.36 | | 0.895 |
| 5 | | 1.00 | 1.00 | | 0.20 | | | 0.29 | | 0.712 |
| R | | | | | | | | | | |
| a | | | 1.00 | 1.00 | 2.76 | 3.47 | | | | 2.469 |
| b | | | 1.00 | 1.00 | 0.71 | | 3.47 | | | |
| c | | | 1.00 | 1.00 | | 0.71 | 2.76 | | | |

I claim:

1. A method of speed stage shift control of an automobile equipped with an automatic transmission for selectively providing a plurality of speed stages, means for detecting operational conditions of said automobile including vehicle speed, steering angle and actual yaw rate, and an electronic control means for processing signals received from said operational condition detecting means and controlling said automatic transmission so as to shift the speed stages based upon said signals, comprising the steps of calculating a standard yaw rate according to said vehicle speed and said steering angle, comparing the calculated standard yaw rate and the actual yaw rate detected by said operational condition detecting means, and modifying said speed shift control by said electronic control means according to the difference between the actual yaw rate and the standard yaw rate.

2. A method of speed stage shift control of an automobile according to claim 1, wherein a normal load shift pattern and a heavy load shift pattern are provided by different combinations of certain speed stages selected from said plurality of speed stages, said heavy load shift pattern providing generally greater reduction gear ratios for respective speed stages of a series of gradually decreasing gear ratios in the combination of speed stages thereof than reduction gear ratios for respective speed stages of a series of gradually decreasing gear ratios in the combination of speed stages of said normal load shift pattern, and said normal load shift pattern is used for the speed stage shifting when the actual yaw rate is not smaller than the standard yaw rate over a predetermined amount of difference, whereas said heavy load shift pattern is used for the speed stage shifting when the actual yaw rate is smaller than the standard yaw rate over said predetermined amount of difference.

3. A method of speed stage shift control of an automobile according to claim 1, wherein a normal load shift pattern and a heavy load shift pattern are provided with respect to a speed stage shifting diagram including a plurality of shift lines each defined with respect to a relation between vehicle speed and throttle opening for shifting up or down the speed stages, said heavy load shift pattern providing generally lower speed stages than said normal load shift pattern for certain determinate relations between vehicle speed and throttle opening, and said normal load shift pattern is used for the speed stage shifting when the actual yaw rate is not smaller than the standard yaw rate over a predetermined amount of difference, whereas said heavy load shift pattern is used for the speed stage shifting when the actual yaw rate is smaller than the standard yaw rate over said predetermined amount of difference.

4. A method of speed stage shift control of an automobile according to claim 1, wherein, when said automobile is of a rear drive type, the speed stage is shifted up when the actual yaw rate is greater than the standard yaw rate over a first predetermined amount of difference for upshifting.

5. A method of speed stage shift control of an automobile according to claim 4, wherein the speed stage is shifted up more than one speed stage when the actual yaw rate is greater than the standard yaw rate over a second predetermined amount of difference greater than said first predetermined amount of difference for upshifting.

6. A method of speed stage shift control of an automobile according to claim 1, wherein, when said automobile is of a rear drive type, the speed stage is shifted down when the actual yaw rate is smaller than the standard yaw rate over a first predetermined amount of difference for downshifting.

7. A method of speed stage shift control of an automobile according to claim 6, wherein the speed stage is shifted down more than one speed stage when the actual yaw rate is smaller than the standard yaw rate over a second predetermined amount of difference greater than said first predetermined amount of difference for downshifting.

* * * * *